Dec. 15, 1964 K. R. SMITH II 3,161,362

ENDLESS TAPE CARTRIDGE

Filed Jan. 15, 1962 2 Sheets-Sheet 1

INVENTOR.
KOBERT REY SMITH II
BY
Lippincott, Ralls & Hendricson
ATTORNEYS

Dec. 15, 1964 K. R. SMITH II 3,161,362

ENDLESS TAPE CARTRIDGE

Filed Jan. 15, 1962 2 Sheets-Sheet 2

INVENTOR.
KOBERT REY SMITH II

BY

Lippincott, Ralls & Hendricson
ATTORNEYS

United States Patent Office 3,161,362

Patented Dec. 15, 1964

3,161,362

ENDLESS TAPE CARTRIDGE

Kobert Rey Smith II, Los Altos, Calif., assignor, by mesne assignments, to Continental Capital Corporation ("Continental") and Sierra Capital Company ("Sierra"), both of San Francisco, Calif., corporations of California Filed Jan. 15, 1962, Ser. No. 166,311

1 Claim. (Cl. 242—55.19)

The present invention relates in general to the provision of an improved cartridge for magnetic tape or the like adapted for utilization in recording or playback mechanisms for recordation and reproduction of sound with high fidelity.

It is well known that magnetic tape, wire, and the like, is widely employed for the recordation of sound, and it is conventional to provide these magnetic tapes or the like in the form of cartridges or unitary components containing a reel or roll of the medium so that same may be directly employed in recording and playback apparatus without removal of the magnetic medium from the unit. In distinction to double reel devices, there have been advanced and marketed single reel cartridges containing but a single elongated loop of magnetic tape or the like wound about a single hub and adapted for withdrawal from the center of the reel and rewinding above the exterior thereof. Tape containers of this type include mobius loop, continuous loop, and double hub arrangements.

Single loop or endless tape types of magnetic tape cartridges are highly advantageous insofar as ease of use is concerned, however, considerable difficulties have been encountered in the perfection of these devices. It is, for example, recognized that magnetic tape or wire which is withdrawn from the interior of a single multiturn reel thereof and rewound about the exterior of same must slide relative to itself. This gives rise to binding actions produced in part by the establishment of static electric charges between adjacent turns of the magnetic tape or wire. The foregoing difficulty and various others associated with this type of magnetic tape cartridge must be overcome in order to accomplish high fidelity sound recording and playback, inasmuch as a very uniform tape speed is necessary in order to accurately record or reproduce sound. Complicating the problem of high fidelity sound reproduction with endless tape cartridges is the necessity of maintaining a minimum cost of same, inasmuch as it is normally considered that these cartridges shall be "throwaway" items to the extent that a purchaser pays for the magnetic tape or the like and receives same in the cartridge as a convenient manner of handling the tape. Although it is most certainly possible, by excluding limitations regarding physical size and limitations connected with cost of manufacture, to produce endless tape cartridges of very high quality, it yet follows that such is not economically feasible for at least a majority of magnetic tape applications.

Innumerable innovations have been made in this general field to the end of overcoming the various difficulties associated with high fidelity sound reproduction with magnetic tape cartridges. It is, for example, well known to provide graphite bars or similar means for the dissipation of static charges between the adjacent turns of magnetic tape within such a cartridge and it is also accepted that braking means are required to prevent inadvertent unreeling of an undue portion of the magnetic tape when the cartridge is not in use. Certain approaches to the problems encountered in this field involve a plurality of moveable parts normally actuated by recording and reproduction apparatus with which the cartridge is adapted to co-operate. Additionally, various steps have been taken in connection with such co-operating apparatus in an effort to guarantee uniform tape speed across playback and recording heads of the apparatus.

The present invention is particularly directed to an improved tape cartridge adapted for substantially universal utilization with varying types of recording and playback apparatus, which need not be specifically designed or modified to actuate auxiliary portions of a cartridge to obtain desired, and often times necessary, results. An extremely simplified structure is provided hereby to thereby minimize cost of manufacture, and yet at the same time to fully insure an isolation of tape withdrawal irregularities from the location of tape utilization. The invention hereof provides a materially improved tape control not only during utilization of the tape, but also during periods of cartridge handling or shipping, for example, wherein undesirable dislocation of the tape may otherwise occur. This latter advantage is attained herein without the necessity of providing braking means contacting the magnetic tape.

In brief, the present invention comprises a cartridge housing containing a multiturn endless magnetic tape or the like, with such housing being readily separable and having an internal ridge limiting undesired tape unreeling. Also, the invention hereof provides a floating plate disposed atop the coil of magnetic tape and providing a tape feed control as well as guarding against tape crossover that will otherwise produce a kink in the tape. Furthermore, the present invention provides a particular predetermined relationship between a pinch wheel and guide post of the cartridge relative to a drive capstan normally provided in playback and recording apparatus adapted for association with magnetic tape cartridges. Such relationship herein produces a wrapping of the tape about the drive capstan, formed of rubber or the like, and thus makes the capstan the critical member in the tape drive to produce a highly uniform tape movement at the playback mechanism. As the pinch wheel is no longer the critical member, costs thereof are reduced and either fixed or movable pinch wheels may be readily employed. Prior art difficulties of tape binding when withdrawn from the single loop of a cartridge, and also prior difficulties normally encountered in connection with tape flutter produced by minute variations in vertical tape position upon guide means of cartridges are herein substantially entirely overcome. All of the foregoing is accomplished with a maximized simplicity of structure resulting in a minimum cost of construction. The features of the present invention, as set forth in greater detail below, afford a material longevity to the cartridge hereof, so that the same high quality of sound reproduction and playback is still afforded after extended usage of the cartridge.

The present invention is illustrated as to a single preferred embodiment thereof in the accompanying drawing wherein.

Figure 1:
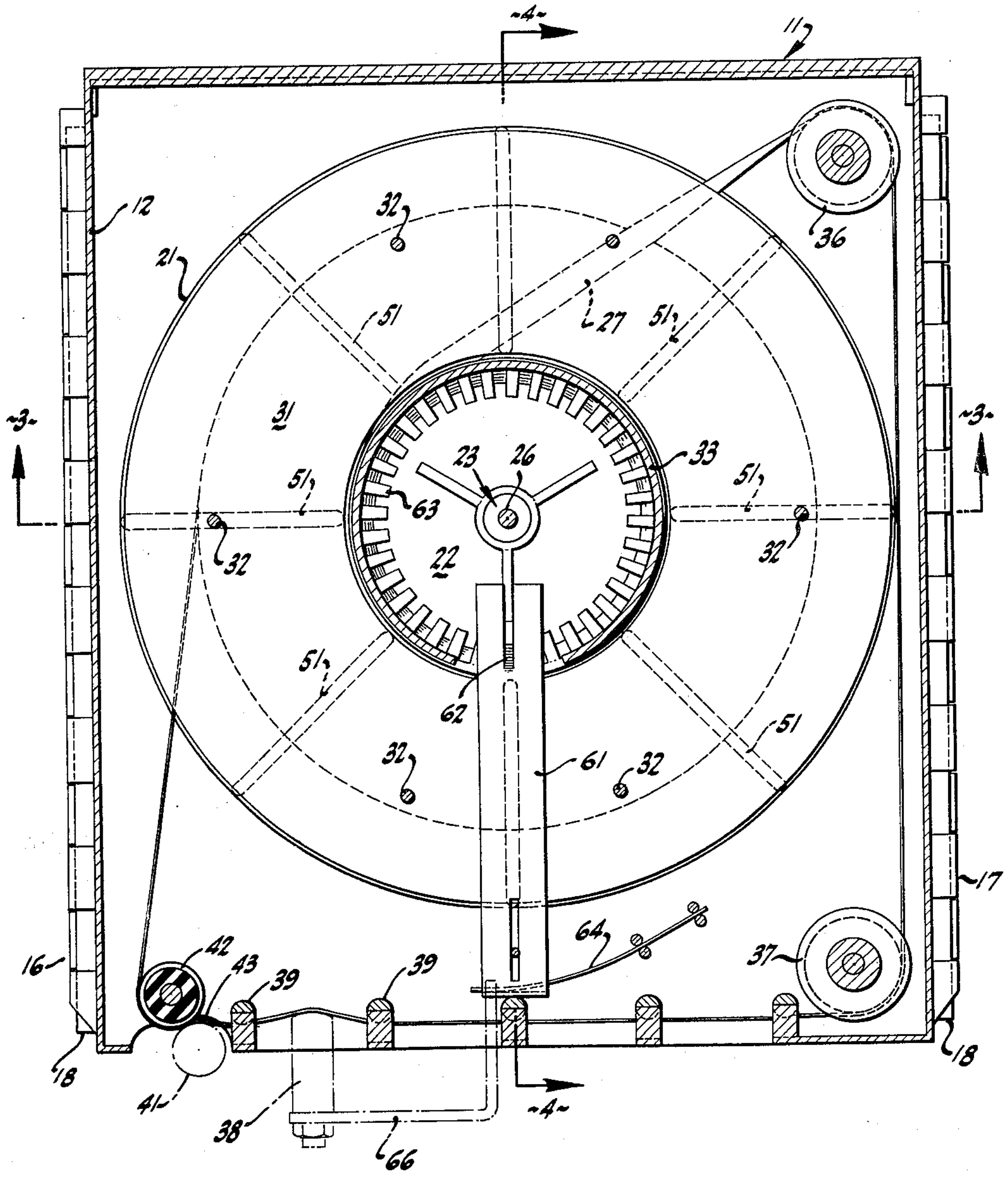
FIGURE 1 is a plan view of the magnetic tape cartridge taken in section through the plane 1—1 of FIGURE 2.
Figure 2:
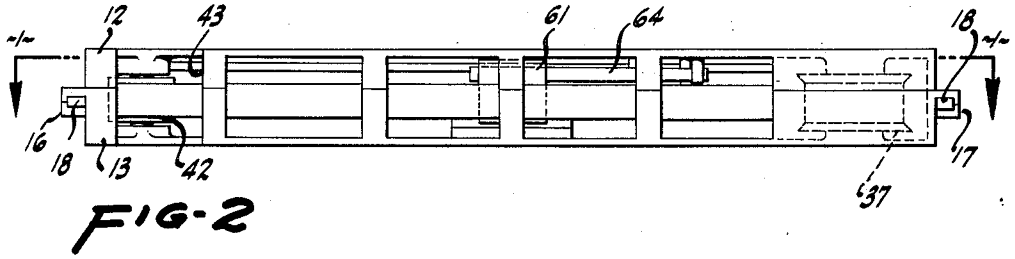
FIGURE 2 is a front elevational view of the magnetic tape cartridge.
Figure 3:
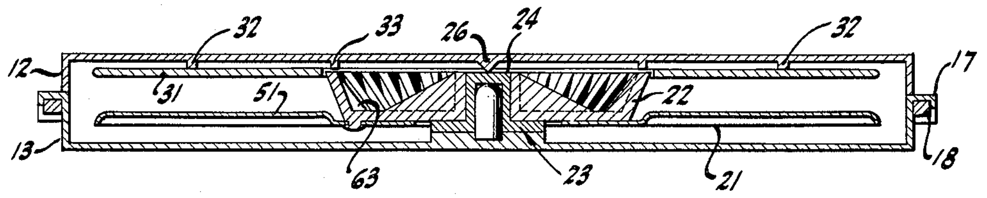
FIGURE 3 is a transverse sectional view in elevation taken in the plane 3—3 of FIGURE 1.

The present invention, in brief, comprises a separable housing having a flat rectangular configuration and containing a rotatable plate upon which there is disposed an endless loop of magnetic tape in a coil about a central hub. Atop the magnetic tape there is provided a floating disc resting upon the tape and it is provided herein that tape shall be withdrawn from the center of the coil thereof and fed back on to the coil at the outer edge of same. Actual tape drive is accomplished by recording or playback means with which the present invention is adapted to co-operate. Conventionally this type of apparatus includes a drive capstan, and the magnetic cartridge hereof in conventional manner is inserted into such apparatus so that the open front of the cartridge is disposed to engage magnetic tape therein with recording and playback heads as well as with the drive capstan. In order to minimize variations in tape velocity across playback or recording heads, the present invention may include tape guide means at the rear of the cartridge, about which the tape is led from the inner convolution of tape, and this rear member of tape guide means is provided with portions insuring against vertical tape motion as regards the plane of the cartridge. The tape is then led about additional guide means at the front of the cartridge and these guide means are at least in part provided in offset relation to a drive capstan of associated apparatus so that the magnetic tape at least in part wraps around or about such capstan. The latter mentioned guide means include what is commonly termed a pinch wheel for pressing the tape against the drive capstan. An annular ridge upon the housing above the inner portion of the tape coil limits the available space for vertical tape motion to prevent tape kinking and there may be further provided braking means engaging the cartridge hub to additionally insure against inadvertent unreeling of one or more full turns of tape during cartridge storage or transportation when the cartridge is not engaged in tape recording apparatus. Various other portions of the present invention as well as those discussed above are set forth in some detail in the following description of a preferred embodiment of the present invention.

Considering now the present invention in some detail and referring to the drawings, there will be seen to be provided a housing 11 having a generally rectangular configuration and formed of separable upper and lower portions 12 and 13. The housing 11 has a minimal heighth and the housing portions 12 and 13 have alternately disposed L shaped projections along the lateral edges thereof, so that in combination these projections form ridges 16 and 17 along the sides of the housing. In addition, these lateral projections define longitudinal keyways within there are disposed rods, bars, or the like 18 for locking together the two portions of the housing. Inasmuch as successive L shaped projections from the top portion 12, for example, are inverted with respect to each other it will be seen that the placement of a bar 18 in the keyway defined between the projections upon both top and bottom will then serve to lock together these two portions of the housing. The longitudinal side ridges 16 and 17 of the cartridge housing may serve as alignment members therefor during insertion of the cartridge within recording and playback mechanism adapted for utilization with magnetic tape to be carried by the cartridge. These ridges will thus be seen to extend along the sides of the cartridge and in FIGURE 1 the lower portion thereof comprises the front end of the cartridge whereat same is adapted to engage tape drive means and suitable heads for recording, playback, erase, and the like operations upon magnetic tape.

Within the cartridge housing there is provided a freely rotatable plate 21 having a central hub portion 22 which may be formed integral with the plate or alternatively may be affixed thereto. This plate 21 and hub 22 is mounted for free rotation upon a thrust bearing 23 including a post extending upwardly from the bottom of the housing 13 into the hub 22. A hub bearing 24 may be fitted into the underside of the hub 22 and a pointed protuberance 26 extends downwardly from the housing top 12 into engagement with the upper surface of this hub bearing 24, as illustrated. It will thus be seen that the hub 22 and attached plate 21 is free to rotate within the housing and the present invention contemplates the provision of a coil of magnetic tape 27 upon this plate about the hub.

In common with conventional endless tape cartridges, the present invention provides for withdrawing magnetic tape from the center of the coil thereof and returning this tape to the outer turn of the coil. The tape itself is formed as an endless loop, and there is illustrated a continuous loop although a mobius loop, having a twist therein, may also be employed. In order to provide the necessary minimization of housing heighth it is conventional in a continuous loop to twist the tape as it is withdrawn from the coil thereof and then to twist the tape back for passage over playback or recording heads engaging the tape at the front of the cartridge. Certain difficulties are commonly encountered in connection with this twisting of the tape, and the present invention provides for the hub 22 to have a tapered circumference, wherein the outer edge of the hub tapers inwardly toward the bottom thereof. As tape is withdrawn from the coil it will be seen that the force upon the tape will then serve to press it against the hub and, consequently, to provide an initial inclination or slanting of the tape so that as it is drawn upwardly over the coil of tape, it has an initial turn in the direction of desired twisting of the tape in order that the tape shall be flat as it passes over the coil.

The present invention further provides a floating disc 31 disposed within the housing about the hub and resting upon the upper surface of the coil of tape 27. This disc 31 has an annular configuration with the center opening therethrough being slightly greater in dimension than the diameter of the upper portion of the hub 22. The disc is maintained against undue vertical movement by small lugs 32 extending downwardly from the top portion 12 of housing and bearing upon the upper surface of this disc. In addition, there is provided an annular ridge 33 extending downwardly from the upper portion of the housing above the outer edge of the hub 22. As tape is pulled from the coil thereof it will be seen that the inner turn of tape is drawn upwardly over the floating disc 31, as shown in FIGURE 1, and furthermore that the annular ridge 33 adjacent the outer edge of this hub at the top thereof serves to limit the space available for magnetic tape to extend in any but a desired direction. This is explained at some greater length in the following description of operation of the cartridge hereof.

In distinction to many conventional tape cartridges, the present invention provides for the initial withdrawing of magnetic tape in a direction toward the rear of the housing, rather than toward the front thereof. There is provided a guide means in the form of a guide roller 36 at the right rear corner of the housing within same and about which the tape is extended from the center of the tape coil. This guide means may comprise a roller which is provided with a flanged top so that the tape is contained beneath such flange as it is twisted back from the flat orientation in passage over the floating disc to the upright orientation desired for utilization of the tape. Tracing the path of tape travel from this first guide means, or feed means as it may be termed, the tape extends along the side of the housing, interiorly thereof, to a front guide means 37 at the right of the housing as it is viewed from the front end thereof. This front guide means also has a flanged upper end to limit vertical tape motion, however, most tape edge engagement occurs at the rear guide roller so that variations in tape drag across the front of the cartridge is minimized.

Across the front of the cartridge there are provided a plurality of openings in the front wall thereof so that suitable playback, recording, and erase heads, for example, of associated apparatus may extend into the cartridge as the latter is inserted in the apparatus. The tape is directed across the front of the cartridge past these openings and an exemplary head is illustrated at 38 as extending somewhat into one of these openings so as to engage the tape 27 as it passes thereover. A plurality of guide posts 39 are disposed along the front of the cartridge behind the tape, as illustrated.

Actual tape drive, in common with conventional practice, is provided by external means in the form of a drive capstan 41 provided as an integral part of the apparatus with which the magnetic tape hereof is designed to cooperate. There is, however, provided a material difference in cartridge structure from conventional with regard to tape drive. A rotatable pinch wheel 42, formed of rubber or the like, is mounted in the cartridge adjacent the front thereof at the left side as illustrated, however, this pinch wheel will be seen to be offset with respect to the position of the drive capstan 41. Consequently, when the cartridge is inserted in the apparatus, the magnetic tape 27 extending across the relatively open front of the cartridge will be engaged by recording heads, for example, and in addition will, as shown, be curved about the capstan which fits into an indentation 43 in the front of the housing. With the cartridge fully inserted in a recorder, the magnetic tape is thus closely engaged between the captan and pinch wheel so that with driven rotation of the capstan the tape will be frictionally drawn across the front of the cartridge and, consequently, across playback or recording heads engaging the tape thereat. The pinch wheel may be formed of plastic or the like. Rather than provide a "head on" engagement of capstan and pinch wheel as is quite common, the present invention provides a markedly off center engagement so that the tape does, in fact, in part wind about the capstan and, consequently, experiences a much more even and uniform pull so as to further maximize the uniformity of tape velocity. From the pinch wheel the tape extends back to the outer edge of the tape coil and will be seen to automatically rewind upon the coil as the tape is driven by the capstan for withdrawing the tape from the inner portion of the tape coil.

Insofar as the generalities of single reel tape drive are concerned, the present invention follows conventional practice and, of course, one of the unavoidable circumstances associated therewith is the relative sliding of adjacent turns of tape on the coil as same is withdrawn from the center and fed back onto the outer portion thereof. This condition in itself serves to provide an uneven frictional drag upon the tape, which is counteracted herein by the particular capstan-pinch wheel engagement, the floating disc across which the tape passes, and the extent of tape traverse after withdrawal from the coil and prior to passage over playback or recording heads of apparatus associated with the cartridge. It is also recognized that the relative slippage of adjacent turns of tape on the coil serve to build up static charges on the tape, which furthermore tend to cause a binding action. Although various solutions to the dissipation of these charges have hitherto been advanced, the present invention provides an extremely simple solution. Certain conventional tape cartridges require the provision of graphite bars or the like so that the coil is radially engaged by such members. The present invention provides only a plurality of radial ridges 51 upon the upper surface of the annular plate 21 so that the coil of tape actually rests upon these ridges rather than upon the total flat surface of the plate. Extensive experimentation has shown that the substantially complete dissipation of static charges is affected by this structure, even though the plate 21 and ridges 51 thereupon are formed of an electrically non-conducting material such as plastic. In this respect it is further noted that the majority of the portions of the tape cartridge hereof are formed of a light weight material such as plastic which may be quite readily formed into desired shapes and which is quite inexpensive to manufacture.

In addition to the foregoing portions of the magnetic tape cartridge hereof, there is provided a braking mechanism which in the present invention serves to lock the hub 22 against rotation when the brake itself is engaged. Again contrary to many common practices, the present invention does not provide for clamping of the magnetic tape itself. The brake mechanism of this invention comprises only an L-shaped member 61 extending from the front of the tape cartridge housing over the top of the floating disc and through an opening in the annular ridge 33, and having a depending lug 62 at the inner end thereof. The hub itself is formed with an annular depression in the top thereof, and having a cog-like configuration about the rim of this indentation to form a plurality of radial slots 63 into which the brake lug 62 will slide. The brake itself is spring loaded as by means of a leaf spring 64 urging the brake toward the front of the housing, and alignment of the brake 61 may be accomplished by the provision of one or more pins extending from the top of the housing into slots in the brake. The brake mechanism is adapted to be operated or disengaged from locking relation with the hub by an arm provided upon the recording and playback mechanism with which the cartridge hereof co-operates. This arm illustrated in phantom at 66 of FIGURE 1 may be mounted about a playback head 38 and extends through an opening in the front of the cartridge housing, as illustrated. Full insertion of the cartridge will then serve to engage this arm with the front of the brake 61 so as to move this brake inwardly of the cartridge housing against the force of the spring 64, and, consequently, to move the brake lug 62 out of engagement with the cogged portion of the hub 22. It will thus be seen that it is only upon full insertion of the cartridge within recording or playback mechanism that the brake is released and the hub is free to rotate.

Considering now the operation of the present invention, and particularly the manner in which the novel features hereof influence such operation, it is noted that the cartridge is adapted to be slid into a tape recorder and that the side ridges 16 and 17 may serve to align the cartridge within such apparatus. A complete cartridge includes the magnetic tape 27 coiled about the hub within the cartridge and extending in a single loop about the various tape guide means above described. Upon insertion of the cartridge in a magnetic tape recorder, the arm 66 or similar member provided upon such apparatus, will engage the brake 61 to release the hub 22 for free rotation. Before proceeding with the discussion of actual recording operations with the cartridge hereof, it is noted that prior to brake release the hub is locked in position, however, the magnetic tape itself is not physically engaged by any braking means. It has been found with various conventional magnetic tape cartridges of the endless tape type that the inner turn of tape tends to become unwound from the central hub during conditions of storage or shipping unless the tape itself is physically engaged by some member within the housing. This difficulty is precluded in the present invention by the provision of the annular ridge 33 immediately above the hub and limiting the volume of space available thereat for possible tape passage. Furthermore, the floating disc 31 resting upon the top of the tape limits vertical displacement of the tape within the cartridge even during handling or shipping operations. With the tape so confined within the cartridge hereof it has been found that even without a brake, such as that illustrated, there is an extremely small likelihood of the tape unwinding from the center of the coil thereof, for to do so the tape would have to pass between the top of the hub and the annular ridge 33 depending immediately above same.

With the cartridge hereof inserted in a magnetic recorder and the brake released, the magnetic tape extending about the guide means and pinch wheel is also engaged by the capstan 41 of the recorder as well as by one or more heads 38 of the recorder. These heads extend through openings in the front face of the cartridge, and the capstan actually extends somewhat into the cartridge within the indentation 43 formed in the front of the cartridge. It will be seen from FIGURE 1 of the drawing that the magnetic tape is constrained to in part wrap about the capstan 41 because of the offset relation between this capstan and the pinch wheel of the cartridge. The present invention provides a capstan formed of a relatively soft material with a sufficiently high coefficient of friction to grip the tape and, consequently, to draw the tape between the pinch wheel and capstan upon driven rotation of the capstan. It is well recognized that certain variations in pressure between capstan and pinch wheel do normally occur and the offset relation, herein provided, minimizes the effects of such pressure variations so that there is herein attained a substantially constant velocity of tape drive. With the pinch wheel and drive capstan disposed in conventional relationship minute variations in the amount of engagement or pressure of engagement between these elements, as may be caused by unavoidable tolerances in the mechanism or wear therein, cause a substantial change in the pressure exerted on the tape by these elements. With the present tape cartridge having an offset pinch wheel, such slight variations in the relative positions of capstan and pinch wheel do not cause the same change in pressure therebetween. Consequently, the present invention provides for a much more even tape drive than is possible with conventional arrangements.

With tape being driven in the manner noted above, it will be withdrawn from the hub 22 and it is again noted in this respect that the tape is originally slanted from vertical so that it readily twists into a horizontal position as it passes over the floating disc 31. This tape withdrawn from the inner convolution of the tape coil then extends about the guide roller 36 which has a flanged top to turn the tape back into a vertical position. As the tape passes over the floating disc to the guide roller, the disc tends to rotate with the tape coil. Variations in tape drag in leaving the hub are in large part taken up in tape passage over the floating disc which will carry the tape more or less past the feed roller to even out tape feed thereto. In the twisting of the tape from the horizontal position where it passes over the coil and floating disc to the vertical position desired for tape traverse, there is unavoidably encountered a certain amount of tape edge contact with the top restraining flange of the guide roller 36. Inasmuch as the amount of this edge contact varies, it will be appreciated that some variation in drag occurs and that this drag tends to vary the tape velocity. With a rear guide roller, as illustrated, a relatively extended tape traverse is provided between the guide roller and the front roller or guide 37 so that slight pulsations or unevenness in the tape velocity will have an opportunity to even out. Also, with this arrangement, tape pressure against the roller flange from twisting of the tape is limited to the rear roller so that the front roller flange serves only as a guide. Passage of the tape across the front of the housing provides the tape in position for engagement with the various heads of the magnetic recorder, so that information may be impressed upon the magnetic tape or obtained therefrom in conventional manner. As the tape leaves the pinch wheel and capstan it returns to the outer turn of the tape coil upon the hub, and in operation, the endless loop of tape continuously passes over the playback or recording heads of the magnetic recorder with a very constant velocity so as to enable truly high fidelity recording and playback.

The tape coil will be seen to be disposed between the lower plate 21 about the hub 22 and the upper floating disc 31. As above noted, the radial ridges 51 upon the supporting plate 21 actually engage the magnetic tape. These ridges provide for a dissipation of static charges built up between adjacent turns of the tape by unavoidable slippage between the turns resulting from the withdrawal of tape from a small diameter of the coil and the feeding of the tape back on to a larger diameter thereof.

It is not necessary for these supporting ridges 51 to be formed of an electrically conducting material, although this is of course possible. Conventional magnetic tape employed for sound recording has a minute amount of graphite upon at least one surface thereof, and it has been found through extensive experimentation that a sufficient amount of this graphite coats the radial ridges 51 to provide for adequate dissipation of static charges built up between turns of the tape.

As regards the materials of construction for the improved tape cartridge of the present invention, it will be seen that substantially all of the parts hereof may be formed of inexpensive light weight materials such as plastic. It will further be noted that the cartridge housing is substantially entirely enclosed, with openings being provided only in the front thereof for the ready insertion of playback or recording heads and for the engagement of the capstan 41 with the pinch wheel of the cartridge. While magnetic tape cartridges are conventionally sealed units to the extent that the magnetic tape is originally positioned therein and cannot be removed, the present invention provides relatively ready access to the tape under those conditions where same may be desirable. Opening of the cartridge hereof is quite readily accomplished by withdrawing the bars 18 fitting in the keyways along the sides of the housing. Upon removal of these bars the upper and lower portions 12 and 13 of the housing may be readily separated. It is further noted that the thrust bearing mounting of the tape hub 22 provides a highly advantageous and smoothly operating hub rotation. Additionally, this type of structure is quite inexpensive, in line with the above-noted requirement of low cost for the entire magnetic cartridge.

Figures 4, 5, 6:
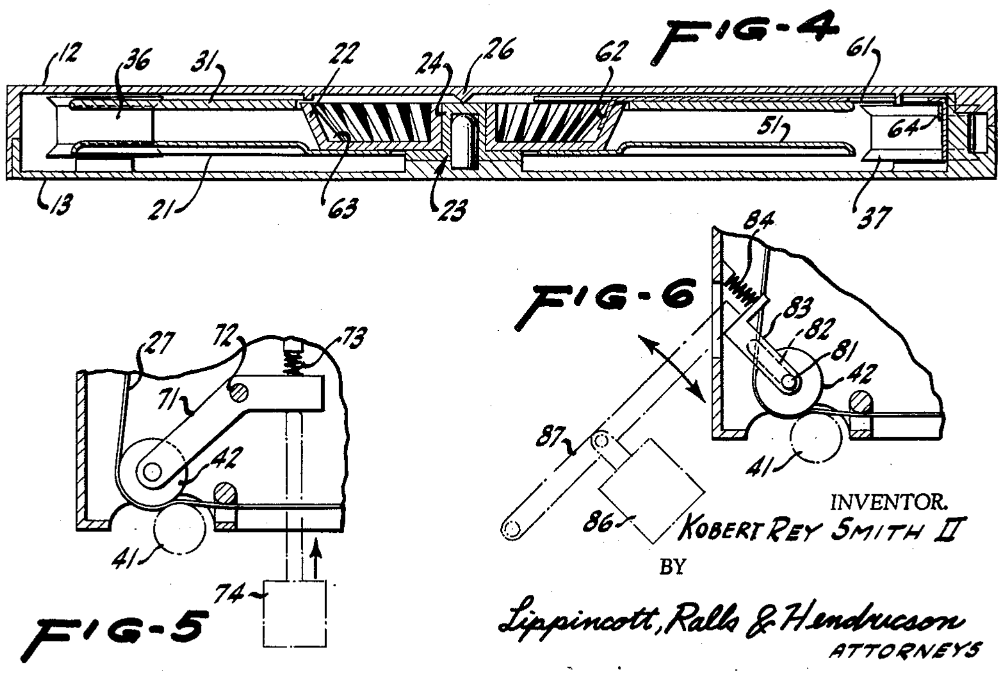
FIGURE 4 is a longitudinal sectional view taken in the plane 4—4 of FIGURE 1.
FIGURES 5 and 6 are partial sectional views of alternative movable pinch wheel arrangements.

Numerous variations of the showing herein may be made within the scope of the present invention and FIGURES 5 and 6 illustrate alternative pinch wheel arrangements, wherein such elements are movably mounted. While magnetic tape cartridges with movable pinch wheels are known in the art, same commonly include substantial complexity in the structure thereof. The present invention, on the other hand, provides a simple and inexpensive structure, as described below, to the end of simplifying the cartridge and also the necessary cartridge-engaging structure of tape recorders. A tape cartridge inserted in a tape recorder may be grasped by elements of the latter and then automatically moved slightly forward by elements of the recorder to engage the capstan with the tape against the pinch wheel. Such movement may be accomplished by solenoids or the like and the provision of a movable pinch wheel allows the tape recorder equipment to move only the pinch wheel of the cartridge rather than the whole cartridge, so that less power is required and smaller components may be utilized. Desired engagement of pinch wheel and capstan for tape drive thus requires only the application of a minute force upon the pinch wheel with the cartridge housing remaining stationary.

Cinsidering first the illustration of FIGURE 5, there is shown a pivotally mounted pinch wheel 42 adapted for movement toward and away from the capstan 41. Pivot means such as at least one bell crank 71 is affixed to the pinch wheel and is itself pivotally mounted in the housing at 72. This crank 71 is spring loaded as by the spring 73 to normally pivot the pinch wheel slightly away from the open front of the housing. The plunger of a solenoid 74 provided as a part of the tape recorder extends into the housing to contact an end of the bell crank 71 so that upon solenoid energization the plunger extends to pivot the crank against spring tension into the illustrated position for tape drive.

In this configuration described above and shown in FIGURE 5 the pinch wheel is yet mounted for rotation and preferably is engaged at both top and bottom by bell cranks in order that the pinch wheel may be evenly held during use and no wobble of the pinch wheel can occur.

The pivot means may be mounted at 72 by a shaft formed with or affixed to the housing, and the spring 73 is affixed to the crank arm so that motion of the pinch wheel is limited.

An alternative movable pinch wheel mounting is shown in FIGURE 6, wherein a sliding pinch wheel is employed. The pinch wheel 42 has a central shaft 81 extending from the ends thereof and fitting into slots 82 in the housing so that the pinch wheel is slidable toward and away from the capstan 41. Arms 83 extend from the pinch wheel at top and bottom thereof with the shaft 81 rotatably mounted in such arms. A spring or the like 84 engages the arms or a link therebetween to normally pull the pinch wheel in the slots 82 away from the capstan. Actuating means such as a solenoid 86 provided in the tape recorder has a plunger secured to a pivotally mounted lever arm 87, also a part of the tape recorder. This lever arm extends into the cartridge housing into engagement with the pinch wheel arms so that, upon solenoid energization to draw the plunger into the body thereof, the lever arm 87 is pivoted about its outer fixed end to push on the pinch wheel arms 83. This then slides the pinch wheel in the slots 82 toward the capstan to grip the tape between pinch wheel and capstan for tape drive. The solenoid is provided with a sufficient "throw" to move the lever arm into and out of the cartridge on an arc, as indicated by the arrows.

There has been described above particular preferred embodiments of the present invention with emphasis upon certain novel and highly advantageous features hereof serving to provide a material advancement over conventional magnetic tape cartridges. It is considered that the desirability and advantages of mobius loop or continuous loop cartridges are well known in the art, particularly with regard to the minimization of size and simplicity of utilization, so that no discussion thereof is believed necessary. It will be seen that the present invention as hereinabove described provides an advancement in the art, not only in variations of physical structure but in the provision of capabilities for high fidelity sound recording hitherto unavailable with endless tape cartridges of minimum size and cost. It is not intended to limit the present invention by the terms of the above description, but instead reference is made to the appended claim for a precise delineation of the true scope of the present invention.

What is claimed is:

A magnetic tape cartridge comprising a flat rectangular housing having front end openings and containing a thrust bearing and an endless magnetic tape disposed in a coil with a loop extending from the center of the coil to the exterior thereof, a central hub mounted for rotation upon said thrust bearing in the housing and having a plate extending therefrom for supporting said tape coil which is disposed about the hub, said hub having a central recess coaxially of the top thereof with a plurality of radial slots about the rim of said recess, an annular floating disc disposed atop the tape coil about the top of the hub and maintained upon the coil by housing projections, an annular depending ridge within the housing above the hub and in close proximity therewith slightly inwardly of the periphery thereof, said tape loop being twisted from vertical to horizontal orientation in extension from the inner coil convolution over said floating disc, a guide roller mounted for rotation in the housing and having said tape loop extending thereabout beneath a top roller flange to twist the tape back into vertical position, tape guide means across the front of the housing, a pinch wheel adjacent an end guide means with the tape extending across same and back to the outside of the coil to complete said tape loop, said end guide means being disposed adjacent said pinch wheel behind the tape, said housing having an indentation in the front thereof between said pinch wheel and end guide means for partial entry of a tape recorder drive capstan upon insertion of the cartridge in a tape recorder, whereby the pinch wheel and capstan engage each other in off-center relation with the tape therebetween and such engagement partially wraps the tape about the capstan and about a substantial portion of the pinch wheel for maximizing uniformity of tape velocity as imparted by the drive capstan, and braking means including an arm mounted within said housing for movement radially over said disc from the front end of said housing, said arm having a depending lug engageable with said slots, said arm spring loaded in the radially outward direction to normally engage said lug with said slots, said arm having an outer end disposed within one of said front end openings and engageable with tape recorder elements upon insertion of the cartridge in a tape recorder, said arm being thereby urged radially inward to disengage said lug from said slots and release said hub.

References Cited in the file of this patent

UNITED STATES PATENTS

| | | |
|---|---|---|
| 1,457,155 | Fey | May 29, 1923 |
| 2,778,880 | Eash | Jan. 22, 1957 |
| 2,810,574 | Daniel | Oct. 22, 1957 |
| 2,814,810 | Kelly | Dec. 3, 1957 |
| 2,837,332 | Busch | June 3, 1958 |
| 2,898,409 | Tiger | Aug. 4, 1959 |
| 2,922,642 | Cousino | Jan. 26, 1960 |
| 2,951,654 | Steelman | Sept. 6, 1960 |

FOREIGN PATENTS

| | | |
|---|---|---|
| 496,974 | Great Britain | Dec. 9, 1938 |